(12) United States Patent
Mangeret et al.

(10) Patent No.: US 7,241,824 B2
(45) Date of Patent: Jul. 10, 2007

(54) RUBBER COMPOSITION FOR A TIRE COMPRISING A COUPLING AGENT (WHITE FILLER/DIENE ELASTOMER) ACTIVATED BY A HEAT-TRIGGERED RADICAL INITIATOR

(75) Inventors: Jean-Luc Mangeret, Riom (FR); Jean-Claude Tardivat, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 359 days.

(21) Appl. No.: 10/178,725

(22) Filed: Jun. 24, 2002

(65) Prior Publication Data

US 2004/0249048 A1 Dec. 9, 2004

Related U.S. Application Data

(63) Continuation of application No. PCT/EP00/13291, filed on Dec. 27, 2000.

(30) Foreign Application Priority Data

Dec. 30, 1999 (FR) .................................... 99 16843

(51) Int. Cl.
*C08K 5/5419* (2006.01)
*C08K 3/00* (2006.01)
*B60C 1/00* (2006.01)

(52) U.S. Cl. .................. 524/264; 523/200; 523/212; 523/216; 524/261; 524/430; 524/442; 524/492; 524/571; 524/573; 524/574; 524/545; 524/575.5; 152/905

(58) Field of Classification Search ................. 523/200, 523/212, 216; 524/430, 442, 401, 492, 571, 524/573, 574, 575, 575.5, 264, 261
See application file for complete search history.

(56) References Cited

U.S. PATENT DOCUMENTS 3,471,439 A * 10/1969 Harris et al. ................. 523/202
3,664,403 A    5/1972 Doran
4,481,322 A * 11/1984 Godlewski et al. ......... 524/265
5,484,848 A *  1/1996 Jadamus et al. ............. 525/105
5,569,697 A * 10/1996 Ferrandino et al. ......... 524/492
5,872,171 A *  2/1999 Detrano ...................... 524/492
6,410,625 B1* 6/2002 Materne et al. ............. 524/262
6,465,581 B1* 10/2002 Wideman et al. ......... 525/332.7
2004/0059049 A1* 3/2004 Barruel et al. .............. 524/588

FOREIGN PATENT DOCUMENTS

DE         4319142         12/1994

\* cited by examiner

Primary Examiner—Vasu Jagannathan
Assistant Examiner—Vickey Ronesi
(74) Attorney, Agent, or Firm—Buchanan Ingersoll & Rooney PC

(57) ABSTRACT

A sulphur-vulcanizable rubber composition usable for the manufacture of tires, based on at least:
(A)—one diene elastomer selected from the group consisting of polybutadienes, natural rubber, synthetic polyisoprenes, butadiene copolymers, isoprene copolymers and mixtures of these elastomers (component A);
(B)—a reinforcing white filler (component B);
(C)—a coupling agent (white filler/diene elastomer) bearing at least one activated double ethylene bond (component C), with which there is associated:
(D)—between 0.05 and 1 phr (parts by weight per hundred of elastomer) of a heat-triggered radical initiator (component D).

The coupling agent is in particular an alkoxysilane of the family of alkoxy($C_1$–$C_4$)-silylpropyls, in particular a trialkoxy($C_1$–$C_4$)-silylpropyl methacrylate, in particular trimethoxy-silylpropyl methacrylate. Process for preparing such a rubber composition. Tire or semi-finished product, in particular tread, for a tire comprising a rubber composition according to the invention.

10 Claims, 3 Drawing Sheets

RUBBER COMPOSITION FOR A TIRE COMPRISING A COUPLING AGENT (WHITE FILLER/DIENE ELASTOMER) ACTIVATED BY A HEAT-TRIGGERED RADICAL INITIATOR

The present application is a continuation of International Patent Application No. PCT/EP00/13291, filed 27 Dec. 2000, published 12 Jul. 2001 in the French language under PCT Article 21(2) as Publication No. WO 01/49781, which application claims priority to French Patent Application No. 99/16843 filed 30 Dec. 1999.

The present invention relates to diene rubber compositions reinforced with a white filler, which are intended in particular for the manufacture of tires or semi-finished products for tires, in particular to the treads for these tires.

Since fuel economies and the need to protect the environment have become priorities, it has become desirable to produce elastomers with good mechanical properties and as low a hysteresis as possible so that they can be used in the form of rubber compositions usable for the manufacture of various semi-finished products involved in the constitution of tires, such as, for example, underlayers, calendering or sidewall rubbers, or treads, and to obtain tires with improved properties, having in particular reduced rolling resistance.

To achieve such an objective, numerous solutions have been proposed, first of all ones essentially concentrating on the use of elastomers modified by means of agents such as coupling, starring or functionalising agents, with carbon black as the reinforcing filler, with the aim of obtaining a good interaction between the modified elastomer and the carbon black. For it is generally known that in order to obtain the optimum reinforcement properties imparted by a filler, the latter should be present in the elastomeric matrix in a final form which is both as finely divided as possible and distributed as homogenously as possible. Now, such conditions may only be obtained insofar as the filler has a very good ability firstly to be incorporated into the matrix during mixing with the elastomer and to disagglomerate, and secondly to be dispersed homogenously in the elastomer.

It is well known that carbon black has such abilities, which is generally not true of white fillers. For reasons of mutual attraction, the white filler particles have an irritating tendency to agglomerate together within the elastomeric matrix. These interactions have the harmful consequence of limiting the dispersion of the filler and hence the reinforcing properties to a substantially lower level than that which it would be theoretically possible to achieve if all the (white filler/elastomer) bonds that could be created during the mixing operation were in fact obtained; these interactions furthermore tend to increase the consistency of the rubber compositions in the uncured state and therefore to make them more difficult to work ("processability") than in the presence of carbon black.

However, interest in rubber compositions reinforced with white filler was greatly revived with the publication of European Patent Application EP-A-0 501 227, which discloses a sulphur-vulcanizable diene rubber composition, reinforced with a special precipitated silica of the highly dispersible type, which makes it possible to manufacture a tire or tread with substantially improved rolling resistance, without adversely affecting the other properties, in particular those of grip, endurance and wear resistance.

European Patent Application EP-A-0 810 258 discloses a diene rubber composition reinforced by another special white filler, in this case a specific alumina ($Al_2O_3$) of high dispersibility, which also makes it possible to obtain tires or treads having such an excellent compromise of contradictory properties.

Although the use of these specific, highly dispersible silicas or aluminas as reinforcing fillers, whether or not as the majority reinforcing filler, has reduced the difficulty of processing the rubber compositions that contain them, they are still more difficult to process than for rubber compositions filled conventionally with carbon black.

In particular, it is necessary to use a coupling agent, also known as a bonding agent, the function of which is to provide the connection between the surface of the white filler particles and the elastomer, while also facilitating the dispersion of this white filler within the elastomeric matrix.

The term "coupling agent" (white filler/elastomer) is understood in known manner to mean an agent capable of establishing a sufficient chemical and/or physical connection between the white filler and the elastomer; such a coupling agent, which is at least bifunctional, has, for example, the simplified general formula "Y—A—X", in which:

Y represents a functional group ("Y" function) which is capable of bonding physically and/or chemically with the white filler, such a bond being able to be established, for example, between a silicon atom of the coupling agent and the hydroxyl (OH) surface groups of the white filler (for example, surface silanols in the case of silica);

X represents a functional group ("X" function) which is capable of bonding physically and/or chemically with the diene elastomer, for example by means of a sulphur atom;

A represents a hydrocarbon group making it possible to link Y and X.

The coupling agents must particularly not be confused with simple agents for covering the white filler which, in known manner, may comprise the Y function which is active with respect to the white filler but are devoid of the X function which is active with respect to the diene elastomer.

Coupling agents, in particular (silica/elastomer) ones, have been described in a large number of documents, the best known being bifunctional alkoxysilanes.

Thus, in patent application FR-A-2 094 859 it was proposed to use a mercaptosilane for the manufacture of tire treads. It was quickly shown, and is today well known, that the mercaptosilanes, and in particular γ-mercaptopropyltrimethoxysilane or γ-mercaptopropyltriethoxysilane, are capable of giving excellent silica/elastomer coupling properties, but that these coupling agents cannot be used industrially because of the high reactivity of the —SH functions, which very rapidly results in premature vulcanization during the preparation of the rubber composition in an internal mixer, this also being known as "scorching", which results in very high Mooney plasticity values and, at the end of the day, results in rubber compositions which are virtually impossible to work and process industrially. To illustrate this impossibility of using such coupling agents and the rubber compositions that contain them industrially, documents FR-A-2 206 330 and U.S. Pat. No. 4,002,594 may be cited.

To overcome this drawback, it has been proposed to replace these mercaptosilanes by polysulphurised alkoxysilanes, in particular bis-trialkoxy($C_1$–$C_4$)silylpropyl polysulphides such as described in numerous patents or patent applications (see for example FR-A-2 206 330, U.S. Pat. No. 3,842,111, U.S. Pat. No. 3,873,489, U.S. Pat. No. 3,978,103 or U.S. Pat. No. 3,997,581). Among these polysulphides, mention will be made in particular of bis-3-triethoxysilylpropyl tetrasulphide (abbreviated to TESPT), which nowadays is regarded as the product which, for vulcanized rubber compositions filled with silica, gives the best compromise in terms of resistance to scorching, processability and reinforcing power, but the known disadvantage of which is to be very costly (see for example patents U.S. Pat. No. 5,652,310, U.S. Pat. No. 5,684,171 and US-A-5 684 172).

During the course of its research, the Applicant discovered that, unexpectedly, coupling agents bearing an activated double ethylene bond may have a superior coupling performance to that of polysulphurised alkoxysilanes, in particular that of TESPT, when a radical initiator of the heat-triggered type is associated therewith in a very small quantity. The association of these two types of compounds furthermore avoids the premature scorching problems and the processing problems which are linked with excessive viscosity of the rubber compositions in the uncured state, which are inherent in particular in mercaptosilanes.

Consequently, a first subject of the invention relates to a sulphur-vulcanizable rubber composition which can be used for the manufacture of tires, based on at least:

(A)—one diene elastomer selected from the group consisting of polybutadienes, natural rubber, synthetic polyisoprenes, butadiene copolymers, isoprene copolymers and mixtures of these elastomers (component A);

(B)—a reinforcing white filler (hereafter referred to as component B);

(C)—a coupling agent (white filler/diene elastomer) bearing at least one activated double ethylene bond (hereafter referred to as component C), with which there is associated:

(D)—between 0.05 and 1 phr (parts by weight per hundred of elastomer) of a heat-triggered radical initiator (hereafter referred to as component D).

Another subject of the invention is the use of a rubber composition according to the invention for the manufacture of tires or for the manufacture of semi-finished products intended for such tires, these semi-finished products being selected in particular from among the group comprising treads, underlayers intended for example to be positioned beneath these treads, crown plies, sidewalls, carcass plies, beads, protectors, inner tubes and airtight internal rubbers for tubeless tires.

The subject of the invention is also these tires and these semi-finished rubber products themselves, when they comprise a rubber composition according to the invention.

The invention relates in particular to treads for tires, these treads being able to be used in the manufacture of new tires or for recapping worn tires; owing to the compositions of the invention, these treads have both low rolling resistance and high wear resistance.

The invention also relates to a process for preparation of a rubber composition usable for the manufacture of tires, this process being characterised in that there is incorporated in at least (i) one diene elastomer selected from the group consisting of polybutadienes, natural rubber, synthetic polyisoprenes, butadiene copolymers, isoprene copolymers and mixtures of these elastomers (component A), at least:

(ii)—a white filler as reinforcing filler (component B);

(iii)—a coupling agent (white filler/diene elastomer) bearing at least one activated double ethylene bond (component C), with which there is associated:

(iv)—between 0.05 and 1 phr (parts by weight per hundred of elastomer) of a heat-triggered radical initiator (component D).

and in that the entire mixture is kneaded thermomechanically, in one or more stages, until a maximum temperature of between 110° C. and 190° C. is reached.

The subject of the invention is furthermore the use of a heat-triggered radical initiator as coupling activator (white filler/diene elastomer) of a coupling agent having an activated double ethylene bond, in a rubber composition based on diene elastomer reinforced with a white filler, said diene elastomer being selected from the group consisting of polybutadienes, natural rubber, synthetic polyisoprenes, butadiene copolymers, isoprene copolymers and mixtures of these elastomers.

Finally, the invention relates to a process for activating, in a sulphur-vulcanizable rubber composition based on diene elastomer and reinforced with a white filler, the coupling function (white filler/diene elastomer) of a coupling agent having an activated double ethylene bond, this process being characterised in that there is incorporated by kneading in at least (i) one diene elastomer selected from the group consisting of polybutadienes, natural rubber, synthetic polyisoprenes, butadiene copolymers, isoprene copolymers and mixtures of these elastomers (component A), at least:

(ii)—a white filler as reinforcing filler (component B);

(iii)—a coupling agent (white filler/diene elastomer) bearing at least one activated double ethylene bond (component C), with which there is associated:

(iv)—between 0.05 and 1 phr (parts by weight per hundred of elastomer) of a heat-triggered radical initiator (component D), and in that the entire mixture is kneaded thermomechanically, in one or more stages, until a maximum temperature of between 110° C. and 190° C. is reached.

The invention and its advantages will be readily understood in the light of the description and examples of embodiment which follow, and of the figures relating to these examples, which show curves of the variation of modulus as a function of elongation for different diene rubber compositions, whether or not in accordance with the invention.

I. MEASUREMENTS AND TESTS USED

The rubber compositions are characterised before and after curing, as indicated below.

I-1. Mooney Plasticity.

An oscillating consistometer such as described in standard AFNOR-NFT-43005 (November 1980) is used. The Mooney plasticity is measured in accordance with the following principle: the raw composition (i.e. before curing) is moulded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton.meter).

I-2. Scorching Time

The measurements are effected at 130° C., in accordance with standard AFNOR-NFT-43004 (November 1980). The evolution of the consistometric index as a function of time makes it possible to determine the scorching time for the rubber compositions, assessed in accordance with the above standard by the parameter T5, expressed in minutes, and defined as being the time necessary to obtain an increase in the consistometric index (expressed in MU) of 5 units above the minimum value measured for this index.

I-3. Tensile Tests

These tests make it possible to determine the elasticity stresses and the properties at break. Unless indicated otherwise, they are effected in accordance with standard AFNOR-NFT-46002 of September 1988. The nominal secant moduli (in MPa) at 10% elongation (M10), 100% elongation (M100) and 300% elongation (M300) are measured in a second elongation (i.e. after an accommodation cycle). The breaking stresses (in MPa) and the elongations at break (in %) are also measured. All these tensile measurements are effected under normal conditions of temperature and humidity in accordance with standard AFNOR-NFT-40101 (December 1979).

Processing the tensile data recorded also makes it possible to trace the curve of the modulus as a function of the elongation (see attached FIGS. 1 to 3), the modulus used here being the true secant modulus measured in a first elongation, calculated reduced to the real cross-section of the test piece, and not to the initial section as previously for the nominal moduli.

I-4. Hysteresis Losses

The hysteresis losses (HL) are measured by rebound at 60° C. at the sixth impact, and are expressed in % in accordance with the following equation:

$$HL(\%) = 100[(W_0 - W_1)/W_0],$$

with $W_0$: energy supplied; $W_1$: energy restored.

I-5. Dynamic Properties

The dynamic properties, referred to as $\Delta G^*$ and $\tan(\delta)_{max}$ measured as a function of the deformation, are carried out at 10 Hertz with a peak-to-peak deformation of 0.15% to 50%. The non-linearity $\Delta G^*$ is the difference in the shear modulus between 0.15% and 50% deformation, expressed in MPa. The hysteresis is expressed by the measurement of $\tan(\delta)_{max}$ which corresponds to the maximum of $\tan(\delta)$.

II. CONDITIONS OF CARRYING OUT THE INVENTION

The rubber compositions according to the invention are based on at least each of the following constituents: (i) at least one diene elastomer (component A), (ii) at least one white filler as reinforcing filler (component B), (iii) at least one coupling agent bearing at least one activated double ethylene bond (component C) as coupling agent (white filler/diene elastomer), with which there is associated (iv) at least one heat-triggered radical initiator (component D) as coupling activator.

Of course, the expression "composition based on" is to be understood to mean a composition comprising the mix and/or the product of reaction in situ of the aforementioned compounds (constituents A, B, C and D), some of these compounds being liable to, or intended to, react together, at least in part, during the different phases of manufacture of the composition, in particular during the vulcanization thereof.

II-1. Diene Elastomer (Component A)

"Diene" elastomer or rubber is understood to mean, in known manner, an elastomer resulting at least in part (i.e. a homopolymer or a copolymer) from diene monomers, that is to say, monomers bearing two double carbon—carbon bonds, whether conjugated or not.

Generally, "essentially unsaturated" diene elastomer is understood here to mean a diene elastomer resulting at least in part from conjugated diene monomers, having a content of members or units of diene origin (conjugated dienes) which is greater than 15% (mole %).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the diene elastomer of the composition according to the invention (component A) is selected from among the group consisting of polybutadienes (BR), natural rubber (NR), synthetic polyisoprenes (IR), the various butadiene copolymers, the various isoprene copolymers and mixtures of these elastomers.

Among the polybutadienes, there are suitable in particular those having a content of 1,2-units of between 4% and 80%, or those having a content of cis-1,4 [bonds] of more than 80%.

Among the synthetic polyisoprenes, in particular the cis-1,4-polyisoprenes are suitable.

Among the butadiene or isoprene copolymers, these are understood to be in particular the copolymers obtained by copolymerisation of at least one of these two monomers with one or more vinyl aromatic compounds having from 8 to 20 carbon atoms. Suitable vinyl-aromatic compounds are, for example, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene. The copolymers may contain between 99% and 20% by weight of diene units and between 1% and 80% by weight of vinyl-aromatic units.

Of the butadiene copolymers, mention will be made in particular of butadiene-styrene copolymers (referred to as "SBR"), butadiene-isoprene copolymers (BIR), and butadiene-styrene-isoprene copolymers (SBIR). Of the isoprene copolymers, mention will be made in particular of isobutene-isoprene copolymers (butyl rubber—IIR), isoprene-styrene copolymers (SIR) and the isoprene-butadiene copolymers (BIR) or isoprene-butadiene-styrene copolymers (SBIR) mentioned above.

Of the butadiene-styrene copolymers, in particular those having a styrene content of between 5% and 50% by weight and, more particularly, between 20% and 40%, a content of 1,2-bonds of the butadiene part of between 4% and 65%, and a content of trans-1,4 bonds of between 20% and 80% are suitable. Of the butadiene-isoprene copolymers, in particular those having an isoprene content of between 5% and 90% by weight and a glass transition temperature (Tg) of −40° C. to −80° C. are suitable. As for the isoprene-styrene copolymers, in particular those having a styrene content of between 5% and 50% by weight and a Tg of between −25° C. and −50° C. are suitable. In the case of butadiene-styrene-isoprene copolymers, there are suitable in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2—plus 3,4-units of the isoprene part of between 5% and 70%, and a content of trans-1,4 units of the isoprene part of between 10% and 50%, and more generally any butadiene-styrene-isoprene copolymer having a Tg of between −20° C. and −70° C.

In summary, as component A, particularly a diene elastomer selected from the group of highly unsaturated diene elastomers which consists of polybutadienes, natural rubber, synthetic polyisoprenes, butadiene-styrene copolymers, butadiene-isoprene copolymers, isoprene-styrene copolymers, butadiene-styrene-isoprene copolymers and mixtures of these copolymers is suitable.

The diene elastomer selected may have any microstructure, which is a function of the polymerisation conditions used, in particular of the presence or absence of a modifying and/or randomising agent and the quantities of modifying and/or randomising agent used. It may for example be a block, statistical, sequential or microsequential copolymer, and be prepared in dispersion or in solution; it may be coupled and/or starred or alternatively functionalised with a coupling and/or starring or functionalising agent.

The composition according to the invention is particularly intended for a tread for a tire, be it a new or a used tire (recapping).

In the case of a passenger-car tire, component A is for example an SBR or a SBR/BR, SBR/NR (or SBR/IR), or alternatively BR/NR (or BR/IR) blend (mixture). In the case of an SBR elastomer, in particular an SBR having a styrene content of between 20% and 30% by weight, a content of vinyl bonds of the butadiene part of between 15% and 65%, a content of trans-1,4 bonds of between 15% and 75%, and a Tg of between −20° C. and −55° C. is used, this SBR copolymer, which is preferably prepared in solution, possibly being used in a mixture with a polybutadiene (BR) having preferably more than 90% cis-1,4 bonds.

In the case of a tire for a utility vehicle, in particular for a heavy vehicle—i.e. subway, bus, road transport machinery (lorries, tractors, trailers), off-road vehicles—component A is for example selected from the group consisting of natural rubber, synthetic polyisoprenes, isoprene copolymers (isoprene-butadiene, isoprene-styrene, butadiene-styrene-isoprene) or a mixture of two or more of these compounds. Of course, component A may also be formed, in its entirety or in part, by another highly unsaturated elastomer such as, for example, an SBR elastomer.

The improvement in the coupling provided by the invention is particularly noticeable on compositions based on natural rubber or on synthetic polyisoprene. This is understood to mean rubber compositions in which the diene elastomer (component A) is formed majoritarily (i.e. by more than 50% by weight) of natural rubber, synthetic polyisoprene or a mixture of these compounds.

Advantageously, component A may be formed exclusively of natural rubber, synthetic polyisoprene or of a mixture of these compounds.

Of course, the compositions of the invention may contain, in addition to component A defined above, diene elastomers other than component A, non-diene elastomers, or even polymers other than elastomers, for example thermoplastic polymers.

II-2. Reinforcing Filler (Component B)

The white filler used as reinforcing filler may constitute all or only part of the total reinforcing filler, in the latter case associated, for example, with carbon black.

Preferably, in the rubber compositions according to the invention, the reinforcing white filler constitutes the majority, i.e. more than 50% by weight, of the total reinforcing filler, more preferably more than 80% by weight of this total reinforcing filler.

In the present application, "reinforcing white filler" is understood to mean a "white" filler (i.e. an inorganic or mineral filler), whatever its colour (as opposed to the carbon black), sometimes also called "clear" filler, which is capable, on its own, without any other means than an intermediate coupling system, of reinforcing a rubber composition intended for the manufacture of tires, in other words which is capable of replacing a conventional filler of tire-grade carbon black in its reinforcement function.

Preferably, the reinforcing white filler is a mineral filler of the type silica ($SiO_2$) or alumina ($Al_2O_3$), or a mixture of these two fillers.

The silica used may be any reinforcing silica known to the person skilled in the art, in particular any precipitated or pyrogenic silica having a BET surface area and a specific CTAB surface area both of which are less than 450 $m^2/g$, preferably from 30 to 400 $m^2/g$. Highly dispersible precipitated silicas (referred to as "HD") are preferred, in particular when the invention is used for the manufacture of tires having a low rolling resistance; "highly dispersible silica" is understood to mean, in known manner, any silica having a substantial ability to disagglomerate and to disperse in an elastomeric matrix, which can be observed in known manner by electron or optical microscopy on thin sections. As non-limitative examples of such preferred highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in application EP-A-0 735 088.

The reinforcing alumina preferably used is a highly dispersible alumina having a BET surface area from 30 to 400 $m^2/g$, more preferably between 60 and 250 $m^2/g$, an average particle size of at most 500 nm, more preferably at most 200 nm, such as described in the above application EP-A-0 810 258. As non-limitative examples of such reinforcing aluminas, mention may be made in particular of the aluminas A125, CR125 and D65CR from Baïkowski.

The physical state in which the reinforcing white filler is present is immaterial, whether it is in the form of a powder, microbeads, granules or alternatively balls. Of course, "reinforcing white filler" is also understood to mean mixtures of different reinforcing white fillers, in particular of highly dispersible silicas and/or aluminas such as described above.

When the rubber compositions of the invention are used as treads for tires, the reinforcing white filler used, in particular if it is silica, preferably has a BET surface area of between 60 and 250 $m^2/g$, more preferably between 80 and 200 $m^{21}$ g.

The reinforcing white filler may also be used in a blend (mixture) with carbon black. Suitable carbon blacks are all the carbon blacks, in particular the blacks of the type HAF, ISAF and SAF, which are conventionally used in tires, and particularly in treads for tires. As non-limitative examples of such blacks, mention may be made of the blacks N115, N134, N234, N339, N347 and N375. The amount of carbon black in the total reinforcing filler may vary within wide limits, this quantity of carbon black preferably being less than the quantity of reinforcing white filler present in the rubber composition.

Preferably, the amount of total reinforcing filler (reinforcing white filler plus carbon black if applicable) is between 10 and 200 phr, more preferably between 20 and 150 phr, the optimum differing according to the intended applications; in fact, the level of reinforcement expected of a bicycle tire, for example, is in known manner distinctly lower than that required for a tire capable of travelling at a sustained high speed, for example a motorcycle tire, a passenger-vehicle tire or a tire for a utility vehicle such as a heavy vehicle.

For treads for tires which are liable to travel at high speed, the quantity of reinforcing white filler, in particular if it is silica, is preferably between 30 and 120 phr, more preferably between 40 and 100 phr.

In the present specification, the BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

II-3. Coupling Agent (Component C)

In the compositions of the invention, the coupling (white filler/diene elastomer) is ensured by a specific coupling agent (component C) with which there is associated, in order to activate this coupling, a specific coupling activator (component D).

The coupling agent (component C) used in the rubber compositions according to the invention has the essential characteristic of bearing an activated double ethylene bond ("X" function) which makes it possible to graft on to the diene elastomer. "Activated" bond is understood in known manner to mean a bond made more liable to react (in the present case, with the diene elastomer). Of course, like any other (white filler/diene elastomer) coupling agent, it also bears a second function ("Y" function) which enables it to graft on to the reinforcing white filler, for example an alkoxysilyl function.

Alkoxysilanes, for example, bearing an activated double ethylene bond are known to the person skilled in the art, in particular as coupling agents (white filler/diene elastomer) in rubber compositions; documents U.S. Pat. No. 4,370,448, U.S. Pat. No. 4,603,158, DE-A-4319142, the patent application published under the number JP64-29385 describe in detail such known compounds and/or processes for obtaining them.

The double ethylene bond is preferably activated by the presence of an adjacent electron-attracting group, that is to say one fixed to one of the two carbon atoms of the double ethylene bond. It will be recalled that, by definition, an "electron-attracting" group is a radical or functional group which is able to attract the electrons to itself more than a hydrogen atom would if it occupied the same position in the molecule in question.

This electron-attracting or "activating" group is preferably selected from among the radicals bearing at least one of the bonds C=O, C=C, C≡C, OH, OR(R alkyl) or OAr (Ar aryl), or at least one atom of sulphur and/or nitrogen, or at least one halogen.

Mention will be made more preferably of an activating group selected from among the radicals acyl (—COR), carbonyl (>C=O), carboxyl (—COOH), carboxy-ester (—COOR), carbamyl (—CO—NH2; —CO—NH—R; —CO—N—R₂), alkoxy (—OR), aryloxy (—OAr), hydroxy (—OH), alkenyl (—CH=CHR), alkynyl (—C≡CR), naphthyl ($C_{10}H_7$—), phenyl ($C_6H_5$—), radicals bearing at least one sulphur (S) and/or nitrogen (N) atom, or at least one halogen.

By way of specific examples of such an activating group, mention may be made in particular, apart from those already mentioned, of the radicals acetyl, propionyl, benzoyl, toluyl, formyl, methoxycarbonyl, ethoxycarbonyl, methylcarbamyl, ethylcarbamyl, benzylcarbamyl, phenylcarbamyl, dimethylcarbamyl, diethylcarbamyl, dibenzylcarbamyl, diphenylcarbamyl, methoxy, ethoxy, phenoxy, benzyloxy, vinyl, isopropenyl, isobutenyl, ethynyl, xylyl, tolyl, methylthio, ethylthio, benzylthio, phenylthio, thiocarbonyl, thiuram, sulphinyl, sulphonyl, thiocyanato, amino, toluidino, xylidino, cyano, cyanato, isocyanato, isothiocyanato, hydroxyamino, acetamido, benzamido, nitroso, nitro, azo, hydrazo, hydrazino, azido, ureido, and radicals bearing at least one chlorine or bromine atom.

More preferably still, the electron-attracting group is selected from among carbonyls, carboxyls, carboxy-esters, radicals bearing sulphur and/or nitrogen with a carbonyl root.

Very particularly, in the composition according to the invention, a coupling agent bearing a double ethylene bond which is activated by an adjacent radical bearing a (C=O) bond is used.

As coupling agents preferably suitable for implementing the invention, there are used, without the definition hereafter being limitative, coupling agents of the alkoxysilane type, in particular those of the following general formula (I):

in which:

Z is a group bearing the X function (activated double ethylene bond) which is capable of reacting with the diene elastomer;

T is a divalent hydrocarbon group;

Y corresponds to one of the formulae below:

in which:

the radicals $R^1$, which may or may not be substituted, and may be identical or different, represent a $C_1$–$C_{18}$ alkyl group, a $C_5$–$C_{18}$ cycloalkyl group, or a $C_6$–$C_{18}$ aryl group;

the radicals $R^2$, which may or may not be substituted, and may be identical or different, represent a $C_1$–$C_{18}$ alkoxyl group or a $C_5$–$C_{18}$ cycloalkoxyl group.

The group T, whether substituted or not, is preferably a divalent, saturated or non-saturated hydrocarbon radical, comprising 1 to 18 carbon atoms. In particular $C_1$–$C_{18}$ alkylene groups or $C_6$–$C_{12}$ arylene groups, more particularly $C_1$–$C_{10}$ alkylenes, notably $C_2$–$C_4$ alkylenes, in particular propylene, are suitable.

The radicals $R^1$ are preferably $C_1$–$C_6$ alkyl, cyclohexyl or phenyl groups, in particular $C_1$–$C_4$ alkyl groups, more particularly methyl and/or ethyl.

The radicals $R^2$ are preferably $C_1$–$C_8$ alkoxyl groups or $C_5$–$C_8$ cycloalkoxyl groups, more particularly methoxyl and/or ethoxyl.

The group Z is the group bearing the activated carbon—carbon double bond ("X" function) intended to be grafted on to the diene elastomer during the vulcanization stage, by forming a covalent bond with the latter.

According to a particularly preferred embodiment of the invention, the group Z of formula (I) above is selected from the structural formula (Z-1), (Z-2) or (Z-3) hereafter:

The symbols used in these formulae have the following meanings:

$W_1$ is O, NH, S or $CH_2$;

$W_2$ is N or CH;

the radicals $R^3$ and $R^4$, which may be identical or different, represent hydrogen, a $C_1$–$C_6$ alkyl, whether substituted or non-substituted, or a halogen, in particular bromine, with the proviso that when $R^4$ is the COOH group, $R^3$ is a hydrogen atom.

It will be noted that the role of the "hinges" $W_1$ and $W_2$ is to provide the bond between the radical T and the X function (activated double bond) of the group Z of Formula (I). The point common to the above three structures is the presence of a double ethylene bond (C=C) activated by at least one adjacent carbonyl group (>C=O).

Preferably, the coupling agent of Formula (I) used in the composition according to the invention, which bears the Z group above, is a (mono-, di- or tri-)alkoxy($C_1$–$C_4$)-silylalkyl($C_1$–$C_4$)silane, i.e. a silane bearing, as the "Y" function, at least one $C_1$–$C_4$ alkoxyl radical (radicals $R^2$), the hydrocarbon group T being a ($C_1$–$C_4$)-alkylene. Particularly suitable are (mono-,di- or tri-)alkoxy($C_1$–$C_4$)-silylpropyl-silanes, the hydrocarbon group T being propylene.

More preferably, this coupling agent is selected from the group formed by alkoxy($C_1$–$C_4$)-silylpropyl acrylates, alkoxy($C_1$–$C_4$)-silylpropyl methacrylates, alkoxy($C_1$–$C_4$)-silylpropyl acrylamides, alkoxy($C_1$–$C_4$)-silylpropyl methacrylamides, alkoxy($C_1$–$C_4$)-silylpropyl maleimides, alkoxy($C_1$–$C_4$)-silylpropyl isomaleimides, N-(propyl-alkoxysilane) maleamic acids, N-(propyl-alkoxysilane) fumaramic acids, and mixtures of these compounds.

Preferred examples which may be mentioned are trimethoxy-silylpropyl methacrylate (abbreviated TMSPM), also referred to as methacryloxypropyltrimethoxysilane (Formula II-1 above), N-(propyl-triethoxysilane) maleamic acid (Formula II-2), and N-(propyltriethoxysilane) isomaleimide (Formula II-3) (with Me=methyl; Et=ethyl):

Some of these compounds are known as (white filler/diene elastomer) coupling agents and have been described, for example, in the aforementioned documents JP64-29385, U.S. Pat. No. 4,603,158, U.S. Pat. No. 4,370,448 and DE-A-4319142. The compound of Formula II-1 is sold in particular by Hüls under the name Dynasylan Memo.

In the rubber compositions according to the invention, the content of component (C) is preferably between 0.5% and 20% by weight relative to the weight of reinforcing white filler. Below the minimum amounts indicated, the effect risks being inadequate, whereas beyond the maximum amounts indicated above generally no further improvement in the coupling is observed, whereas the costs of the composition increase. For these reasons, the content of component C is preferably between 3% and 15% by weight relative to the weight of reinforcing white filler, more preferably still between 5 and 12%.

Of course, in order to reduce the costs of the rubber compositions, it is desirable to use as little as possible thereof, that is to say what is just necessary for sufficient coupling between the diene elastomer and the reinforcing white filler. The great activation provided by the radical initiator (component D) makes it possible, in a large number of cases, to use the component C at a preferred rate of less than 10%, more preferably still less than 8%, relative to the weight of reinforcing white filler; amounts of between 4% and 8% are for example possible.

Finally, it will be noted that the coupling agent (component C) previously described could be grafted beforehand (via the "Y" function) onto the reinforcing white filler, the thus "precoupled" filler then being able to be later bonded to the diene elastomer by means of the free "X" function.

II-4. Coupling Activator (Component D)

The second component essential for the coupling (white filler/diene elastomer) is a coupling activator, suitable for activating, that is to say increasing, the coupling function of the coupling agent described previously; this coupling activator, used in a very small proportion (less than 1 phr), is a radical initiator (also called radical starter) of the heat-triggered type.

In known manner, a radical initiator is an organic compound capable, following energy activation, of generating free radicals in situ, in its surrounding medium. The radical initiator of the compositions of the invention is an initiator of the heat-triggered type, that is to say that the supply of energy for creating free radicals has to be in heat form. It is thought that the generation of these free radicals promotes better interaction between the coupling agent and the diene elastomer during manufacture (thermomechanical kneading) of the rubber compositions.

Preferably a radical initiator is selected which has a decomposition temperature of less than 180° C., more preferably less than 160° C., such ranges of temperatures making it possible to benefit fully from the activation effect of the coupling, during the manufacture of the compositions according to the invention.

Thus, component D is preferably selected from the group consisting of peroxides, hydroperoxides, azido compounds, bis(azo) compounds, peracids, peresters and mixtures of these compounds.

More preferably, component D is selected from the group consisting of peroxides, bis(azo) compounds, peresters and mixtures of two or more of these compounds. By way of examples, mention will be made in particular of benzoyl peroxide, acetyl peroxide, lauryl peroxide, cumyl peroxide, tert.-butyl peroxide, tert.-butyl peracetate, tert.-butyl hydroperoxide, cumene hydroperoxide, tert.-butyl cumyl peroxide, 2,5-dimethyl-2,5-bis(tert.-butyl)-3-hexyne peroxide, 1,3-bis (tert.-butyl-isopropyl) benzene peroxide, 2,4-dichlorobenzoyl peroxide, tert.-butyl perbenzoate, 1,1-bis(tert.-butyl)3,3,5-trimethylcyclohexane peroxide, 1,1'-azobis (isobutyronitrile) (abbreviated "AIBN"), 1,1'-azobis (secpentylnitrile) or 1,1'-azobis(cyclohexanecarbonitrile).

According to a particularly preferred embodiment of the invention, the radical initiator used in 1,1-bis(tert-butylperoxy-3,3,5-trimethylcyclohexane which corresponds in known manner to Formula (III-1) below (Me—methyl):

(III-1)

Such a compound is known as a cross-linking agent, in particular for diene rubbers (see for example Kempermann, Rubber Chem. Tech. (1987), 61, p. 422); it is sold, for example, by Flexsys under the name Trigonox 29–40 (40% by weight of peroxide on a solid calcium carbonate support).

According to another advantageous embodiment of the invention, the radical initiator used is 1,1-azobis(isobutyronitrile)—abbreviated AIBN—which corresponds in known manner to Formula (III-2) below:

(III-2)

Such a compound is known as a radical initiator which triggers polymerisation (see for example J. Org. Chem. (1987), 52, p. 2859); it is sold, for example, by Du Pont de Nemours under the name Vazo 64.

As indicated previously, the radical initiator is used in a very small proportion in the compositions according to the invention, namely in a proportion of between 0.05 and 1 phr.

Below the minimum indicated, the effect is inadequate, whereas beyond the maximum indicated no further improvement in the coupling is observed, and there is the risk of scorching (premature cross-linking), in particular if the radical initiator used is liable to act as a cross-linking agent in higher amounts (such is the case, in particular, for peroxides).

In the majority of cases, it has been noted that a particularly low amount, preferably between 0.05 and 0.5 phr, was already sufficient to activate effectively the coupling function of component C; particularly advantageously, an amount of radical initiator of between 0.1 and 0.3 phr will be selected. In amounts as low as those advocated here, it is obvious to the person skilled in the art that the heat-triggered radical initiators, whatever they may be, are not able to result in cross-linking of the compositions (which would then result in a significant increase in rigidity) even if these initiators have, if applicable, in far higher amounts, a cross-linking power with respect to the diene elastomers.

Of course, the optimum content of component D will also be adjusted, within the ranges indicated below, according to the specific conditions of implementation of the invention, namely the type of diene elastomer (component A), the nature of the reinforcing white filler (component B), in particular the nature and the quantity of coupling agent (component C) used. Preferably, the quantity of component D represents between 1% and 10%, more preferably between 2% and 5%, by weight relative to the quantity of component C.

II-5. Various Additives

Of course, the rubber compositions according to the invention also contain all or part of the additives usually used in diene rubber compositions intended for the manufacture of tires, such as, for example, plasticisers, protective agents, a cross-linking system based either on sulphur or on sulphur donors, vulcanization accelerators, extender oils, etc. There may also be associated with the reinforcing white filler, if necessary, a conventional poorly reinforcing or non-reinforcing white filler, such as particles of clay, bentonite, talc, chalk, kaolin or titanium oxides.

The rubber compositions according to the invention may also contain, in addition to the coupling agents (having an activated double bond) and the coupling activators (radical initiators) mentioned above, agents for covering the reinforcing white filler, comprising for example the single Y function, or more generally processing aids liable, in known manner, owing to an improvement in the dispersion of the white filler in the rubber matrix and to a reduction in the viscosity of the compositions, to improve their ability to be worked in the uncured state, these agents being, for example, alkylalkoxysilanes (in particular alkyltriethoxysilanes), polyols, polyethers, (for example polyethylene glycols), primary, secondary or tertiary amines, (for example trialkanol-amines), hydroxylated or hydrolysable polyorganosiloxanes, for example α,ω-dihydroxy-polyorganosiloxanes (in particular α,ω-dihydroxy-polydimethylsiloxanes). The compositions according to the invention might also contain other coupling agents, in addition to the coupling agents bearing at least one activated double ethylene bond, for example polysulphurised alkoxysilanes.

II-6. Preparation of the Rubber Compositions

The compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 60° C. and 100° C., during which finishing phase the cross-linking or vulcanization system is incorporated; such phases have been described, for example, in the aforementioned application EP-A-0 501 227.

The production process according to the invention is characterised in that at least all the base constituents of the compositions according to the invention, namely component B, component C and component D (in an amount of between 0.05 and 1 phr) are incorporated by kneading into component A during the first, so-called non-productive, phase, that is to say that at least these different base constituents are introduced into the mixer and are kneaded thermomechanically, in one or more stages, until a maximum temperature of between 110° C. and 190° C., preferably between 130° C. and 180° C., is reached.

Preferably a radical initiator is selected which has a decomposition temperature lower than the maximum temperature $T_{max}$ reached during the thermomechanical kneading.

By way of example, the first (non-productive) phase is effected in a single thermomechanical step during which all the constituents necessary, including the coupling system formed by associating the components C and D, any additional covering agents or processing agents and various other additives, with the exception of the vulcanization system, are introduced into a suitable mixer, such as a conventional internal mixer. A second stage of thermomechanical working may be added, in this internal mixer, after the mixture has dropped and after intermediate cooling (cooling temperature preferably less than 100° C.), with the aim of making the compositions undergo complementary heat treatment, in particular in order to improve further the dispersion, in the elastomeric matrix, of the reinforcing white filler and its coupling system. The total duration of the kneading, in this non-productive phase, is preferably between 2 and 10 minutes.

After cooling of the mixture thus obtained, the vulcanization system is then incorporated at low temperature, generally in an external mixer such as an open mill; the entire composition is then mixed (productive phase) for several minutes, for example between 5 and 15 minutes.

The final composition thus obtained is then calendered for example in the form of a sheet, a plate or alternatively a rubber profiled element which can be used for the manufacture of semi-finished products such as treads.

The vulcanization (or curing) is carried out in known manner at a temperature generally between 130° C. and 200° C., for a sufficient time which may vary, for example, between 5 and 90 minutes, depending, in particular, on the curing temperature, the vulcanization system adopted and the vulcanization kinetics of the composition in question.

It goes without saying that the invention relates to the rubber compositions previously described, both in the uncured state (i.e. before curing) and in the cured state (i.e. after cross-linking or vulcanization).

Of course, the compositions according to the invention may be used alone or in a blend (i.e. in a mixture) with any other rubber composition usable for manufacturing tires.

III. EXAMPLES OF EMBODIMENT OF THE INVENTION

III-1. Preparation of the Rubber Compositions

For the following tests, the procedure is as follows: the diene elastomer or the mixture of diene elastomers, the reinforcing filler, the coupling system (component C) and its activator (component D), then the various other ingredients, with the exception of the vulcanization system, are introduced into an internal mixer filled to 70% of capacity, the initial tank temperature of which is approximately 60° C. Thermomechanical working (non-productive phase) is then performed in one or two stages, depending on the cases (total duration of kneading between 2 and 10 minutes), until a maximum "dropping" temperature of about 165° C. is obtained.

The mixture thus obtained is recovered, it is cooled and then sulphur and sulphenamide are added on an external mixer (homo-finisher) at 30° C., by mixing everything (productive phase) for an appropriate time, of between 5 and 12 minutes depending on the cases.

The compositions thus obtained are then calendered either in the form of sheets (thickness of 2 to 3 mm) or of thin films of rubber in order to measure their physical or mechanical properties, or in the form of profiled elements which can be used directly, after cutting out and/or assembly to the dimensions desired, for example as semi-finished products for tires, in particular as treads.

In the following tests, the reinforcing white filler (silica and/or alumina) constitutes the entire reinforcing filler; however, a fraction of the latter, preferably a minority fraction, could be replaced by carbon black.

III-2. Tests

A) Test 1

The object of this first test is to demonstrate the improved coupling performance of an alkoxysilane having an activated double bond when it is associated with a heat-triggered radical initiator. This performance is compared on one hand with that of a conventional TESPT coupling agent, and on the other hand with the alkoxysilane having an activated double bond itself when the latter is used on its own, that is to say without a radical initiator.

Five rubber compositions based on natural rubber and reinforced with silica are compared, these compositions being intended for treads for truck tires.

These five compositions are identical, apart from the following differences:
  composition No. 1: coupling agent TESPT (4 phr) used on its own;
  composition No. 2: TESPT (4 phr) with which there is associated 0.16 phr of peroxide;
  composition No. 3: coupling agent TMSPM (3.7 phr) used on its own;
  composition No. 4: TMSPM (3,7 phr) with which there is associated 0.16 phr of peroxide;
  composition No. 5: peroxide (0.16 phr) incorporated with the vulcanization system.

Compositions No. 1 and No. 3 are the reference compositions of the prior art; only composition No. 4 is in accordance with the invention. The two coupling agents tested (TESPT and TMSPM) are used in an isomolar amount of triethoxysilane functions, that is to say that, whatever the composition tested, the same number of moles of triethoxysilane functions which are active with respect to the silica and its hydroxyl surface groups is used. Relative to the weight of white filler, the amount of TESPT is equal to 8%, and that of TMSPM is less than 8% (precisely 7.4%); the quantity of radical initiator used in the composition according to the invention is very low (0.16 phr, namely 4.3% relative to the weight of component C).

Figure 1:
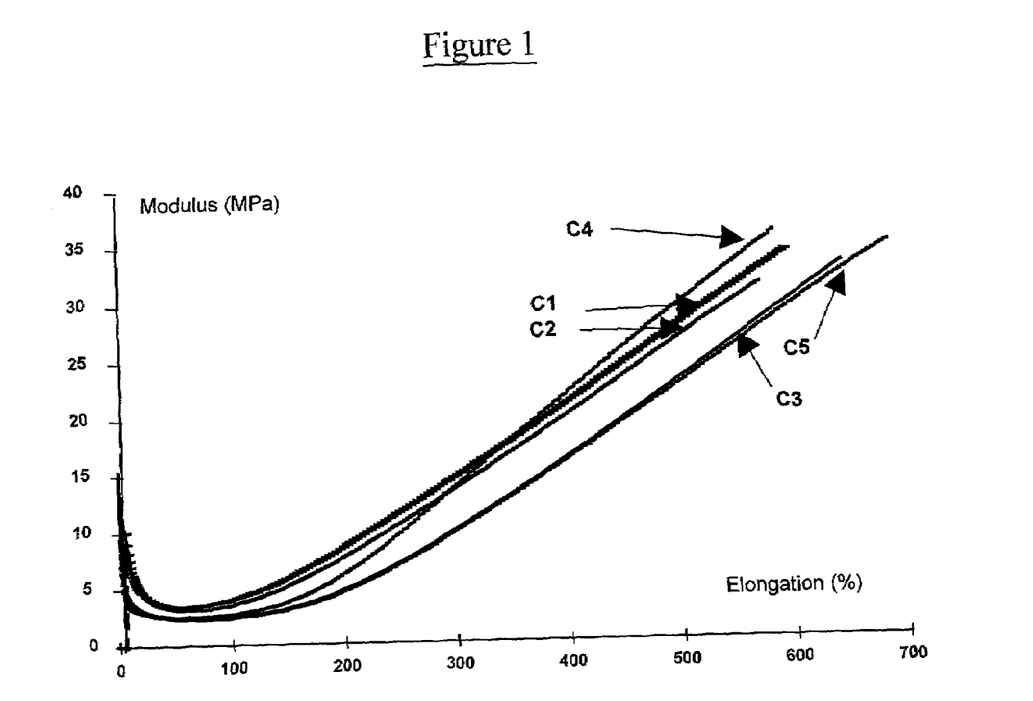

Tables 1 and 2 show the formulation of the different compositions (Table 1—amount of the different products expressed in phr), and their properties before and after curing (25 min at 150° C.). FIG. 1 shows the curves of modulus (in MPa) as a function of the elongation (in %); these curves are marked C1 to C5, and correspond to compositions Nos. 1 to 5 respectively. The vulcanization system is formed by sulphur and sulphenamide, to which there is added 0.16 phr of peroxide in the case of composition No. 5.

The peroxide used here is a 1,1-bis(tert.-butyl)-3,3,5-trimethylcyclohexane peroxide (Formula (III-1) above), available commercially ("Trigonox 29/40") in what is called a "supported" form, in an amount of 40% by weight of peroxide on a solid calcium carbonate support; the amounts set forth in the various tables below correspond to the actual proportion of peroxide, corrected for (i.e. without) the quantity of calcium carbonate.

Examination of the different results of Table 2 and FIG. 1 leads to the following observations:
  the scorching times (T5) are sufficiently long in all cases (22 to 30 minutes), offering a large safety margin with respect to the problem of scorching;
  the Mooney plasticity values remain low (significantly less than 60 MU) whatever the composition in question, which is an indicator of very good ability of the compositions to be processed in the uncured state;
  the Mooney plasticities are substantially identical between compositions No. 1 and No. 2 on one hand, and between compositions No. 3 and No. 5 on the other hand; this shows that the addition of peroxide in the very small amount advocated, both on an internal mixer and on an external mixer (in this latter case with the vulcanization system), has no cross-linking effect on the diene elastomer;
  it should be deduced from this that the increase in viscosity (+10 points) observed on position No. 4 according to the invention, compared with the control composition No. 3, is due to the formation, during mixing, of additional bonds between the white filler and the diene elastomer, in other words of better coupling (white filler/elastomer) due to activation of the coupling provided by the peroxide;
  after curing, the composition according to the invention (No. 4) is the one which has the highest values of modulus under high deformation (M300) and of ratio M300/M100, which are known indicators to the person skilled in the art of the quality of the reinforcement provided by the white filler;
  it is also composition No. 4 which has, very clearly, the most advantageous compromise as far as the hysteresis properties are concerned: very low losses HL, very significant reduction in the non-linearity ΔG* and in tan(δ)max;
  these improved results of composition No. 4 are obtained due to the combined use of the alkoxysilane having an activated double ethylene bond and of the radical initiator, as shown clearly by a comparison between composition No. 4 on one hand and the compositions of the prior art No. 1 to No. 3 (compare in particular compositions No. 3 and No. 4);
  the peroxide, on the other hand, has no activation effect on the conventional coupling agent TESPT (compare compositions No. 1 and No. 2);
  a comparison between compositions No. 3, No. 4 and No. 5 shows, on the other hand, that the peroxide, when incorporated into the external open mill (composition No. 5) in an amount as low as 0.16 phr, has strictly no effect on the properties of the compositions, both in the uncured state and after curing;
  FIG. 1 confirms the preceding observations: composition No. 4 (curve C4) reveals a level of reinforcement (modulus) which is higher at high deformation (elongations of 300% and more), compared with, on one hand, compositions No. 1 and No. 2 based on TESPT (curves C1 and C2), and, on the other hand, with compositions No. 3 and No. 5 based on TMSPM alone (curves C3 and C5); for such a range of elongations, this behaviour illustrates in known manner a better quality of the bond between the reinforcing white filler and the diene elastomer.

In summary, the results above are representative, in the case of the composition according to the invention, of better coupling between the reinforcing white filler and the diene elastomer, in other words of activation by the peroxide of the coupling function of the alkoxysilane having an activated double ethylene bond.

The improved results of composition No. 4 lead one to expect both low rolling resistance and very good wear resistance for treads for tires based on compositions according to the invention.

This test shows, on the other hand, that in order to be able to activate the coupling agent, the peroxide (known, furthermore, as a cross-linking agent in a higher amount, typically of the order of 5 to 7 phr) must be introduced into the internal mixer, that is to say during the non-productive phase at the same time as the coupling agent, and not incorporated in the external mixer (productive phase) as is usually done for a cross-linking agent.

When the peroxide is incorporated during the productive phase, in the external open mill, it can clearly be seen that, for an amount as low as that advocated (less than 1 phr, preferably less than 0.5 phr), it has no cross-linking effect on the diene elastomer.

B) Test 2

The object of this test is to show that the technical effects of the invention are obtained only on coupling agents bearing a double ethylene bond of the activated type.

For this, four rubber compositions based on natural rubber and reinforced with silica are compared, like the compositions of the previous test, these compositions being in particular intended for treads for a truck tire.

The four compositions tested are identical except for the following differences:
  composition No. 6: 1-octene-triethoxysilane coupling agent used on its own (4 phr);
  composition No. 7: 1-octene-triethoxysilane (4 phr), with which there is associated 0.16 phr of the peroxide of Formula III-1;
  composition No. 8: N-(propyltriethoxysilane) isomaleimide (4 phr), with which there is associated 0.16 phr of the peroxide of Formula III-1;

composition No. 9: N-(propyltriethoxysilane) maleamic acid, (4 phr), with which there is associated 0.16 phr of the peroxide of Formula III-1.

The various coupling agents tested are used, as previously, in an isomolar amount of triethoxysilane functions. Relative to the weight of white filler, the amount of coupling agent is in all cases less than 10% (precisely, 9.6%); the quantity of peroxide (component D) in the composition according to the invention is very low: 0.16 phr, or only 3.3% relative to the weight of component C.

The coupling agent used for compositions No. 6 and No. 7 is a known alkoxysilane, the functional group "X" of which is a double ethylene bond of the non-activated type; this compound corresponds to the following formula (OEt=ethoxyl):

The other two alkoxysilanes tested have already been described (see Formulae II-2 and II-3 above); they both comprise a double ethylene bond activated by at least one adjacent carbonyl group. These alkoxysilanes were synthesised in known manner, in accordance with the operating methods described hereafter:

N-(propyltriethoxysilane)maleamic acid (Formula II-2): in a 500 ml three-necked flask surmounted by a condenser, there is dissolved 17.7 g (0.18 mol) of maleic anhydride in 60 ml anhydrous THF (tetrahydrofuran); there is added slowly (duration: approximately 1 h 30 min), at ambient temperature (20° C.), a solution of 41 g (0.1 mol) 3-aminopropyl-triethoxysilane diluted in 155 ml anhydrous THF; the initially uncoloured solution then assumes a yellow colour; the stirring is continued at ambient temperature for two hours, at the end of which the starting products have been entirely used up; the reaction medium is concentrated on a rotary evaporator and 57 g of a yellow solid is obtained, NMR analysis of which reveals that it is indeed the above N-(propyltriethoxysilane) maleamic acid of Formula (II-2) (purity greater than 95%).

N-(3-propyltriethoxysilane) isomaleimide is obtained by action of dicyclohexylcarbodiimide (DCC) on N-(3-propyltriethoxysilane) maleamic acid in THF, generated in situ from maleic anhydride and 3-aminopropyltriethoxysilane; in a 1 liter three-necked flask, there is added drop by drop 41.8 g (0.2 mol) DCC dissolved in 115 ml anhydrous THF to 0.2 mol N-(3-propyltriethoxysilane) maleamic acid generated in situ in 235 ml anhydrous THF; a white precipitate of dicyclohexylurea (DHU) appears; stirring at ambient temperature is continued throughout the night; the DHU is filtered, the THF is evaporated, then the reaction medium is filtered one last time to eliminate the residual DCC; 55 g of a brownish-orange liquid are thus obtained, NMR analysis of which reveals that it is indeed the above N-(propyltriethoxysilane) isomaleamide of Formula (II-3) (purity greater than 95%).

Figure 2:
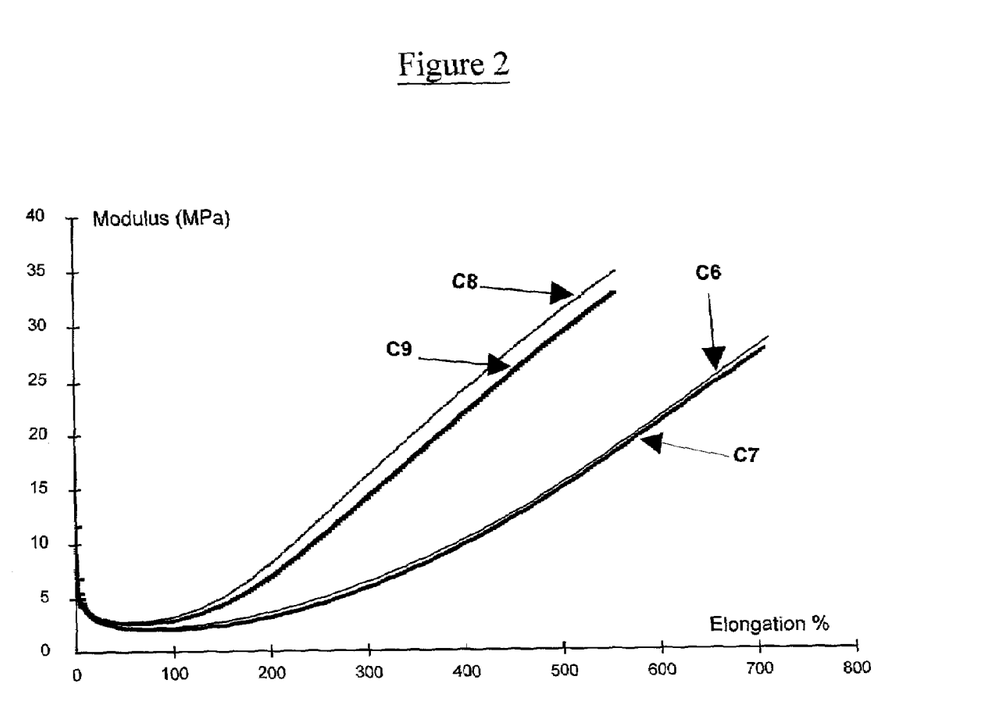

Only compositions No. 8 and No. 9 are therefore in accordance with the invention. Tables 3 and 4 show the formulation of the different compositions, and their properties before and after curing (150° C., 25 minutes). FIG. 2 shows the curves of modulus (in MPa) as a function of the elongation (in %); these curves are marked C6 to C9, and correspond to compositions Nos. 6 to 9 respectively.

The different results of Table 4 show that compositions No. 8 and No. 9 according to the invention, compared with the control compositions, have significantly better performance after curing:

moduli at the highest deformations (M100, M300) and ratio M300/M100 higher, which reveals better reinforcement by the reinforcing white filler;

more advantageous hysteresis properties: HL, non-linearity $\Delta G^*$ and $\tan(\delta)_{max}$ substantially lower; greater rupture stresses.

It will be noted in particular that the incorporation of the peroxide in composition No. 7 comprising as coupling agent the alkoxysilane having a non-activated double bond, in the very low amount used of 0.16 phr, does not have any effect on the properties of the composition, either in the cured or in the uncured state; that in other words the peroxide has no activation effect on the level of coupling (white filler/diene elastomer) if the alkoxysilane used does not bear a double ethylene bond of the activated type.

The attached FIG. 2 confirms the clear effect of improvement of the coupling provided by the radical initiator in the case of alkoxysilanes having an activated double ethylene bond: it can clearly be seen that the values of modulus, for elongations of 100% and more, are substantially identical for Compositions No. 8 and No. 9 (curves C8 and C9 very close), but very substantially greater than those observed on the control compositions No. 6 and No. 7 (curves C6 and C7). It will furthermore be noted that curves C6 and C7 are virtually overlapping, which demonstrates once again that the addition of 0.16 phr of peroxide on the other hand has no effect on the level of coupling offered by the coupling agent 1-octene-triethoxysilane.

C) Test 3

The object of this test is to demonstrate the advantageous effect of the invention on compositions based on diene elastomers other than natural rubber, in the case in point an SBIR copolymer or an SBR copolymer.

Four rubber compositions which are identical, apart from the following differences, are compared:

composition No. 10: SBIR elastomer with coupling agent TESPT (6.4 phr) used on its own;

composition No. 11: SBIR elastomer with coupling agent TMSPM (6 phr) activated by 0.20 phr of radical initiator (peroxide);

composition No. 12: SBR elastomer with coupling agent TESPT (6.4 phr) on its own;

composition No. 13: SBR elastomer with coupling agent TMSPM (6 phr) activated by 0.20 phr of radical initiator (peroxide), Compositions No. 11 and No. 13 are in accordance with the invention, compositions No. 10 and No. 12 using the conventional coupling agent (TESPT) are the control compositions. The two coupling agents tested are used in an isomolar amount, namely about 7–8% by weight relative to the weight of reinforcing white filler; the quantity of radical initiator used in the composition according to the invention is very low (0.20 phr); it represents only 3.3% by weight of component C.

Tables 5 and 6 show the formulation of the different compositions, and their properties before and after curing (150° C., 25 minutes). Studying the various results shows that the compositions No. 11 and No. 13 according to the invention, compared with the control compositions, have characteristics which are improved overall, and this, whatever the elastomer in question:

Mooney plasticity sufficiently low in all cases (less than 55 MU);

high scorching resistance (T5 of 30 min);

higher modulus at high deformation (M300) and ratio M300/M100, which are synonymous with better reinforcement and therefore an improved level of coupling between the diene elastomer and the reinforcing white filler; lower hysteresis losses (HL).

In summary, the conventional reference coupling agent (TESPT) here provides coupling performances which are poorer than those offered by the alkoxysilane having an activated double bond with which there is associated, in the advocated very small proportions, a heat-triggered radical initiator of the peroxide type.

D) Test 4

This test once again illustrates the beneficial effect of the invention in a composition according to the invention based on natural rubber, furthermore comprising a covering agent for the reinforcing white filler.

Two rubber compositions, which are similar to those of Test 1 above, these compositions being identical apart from the following differences, are compared hereafter:
 composition No. 14: coupling agent TESPT (4 phr) used on its own;
 composition No. 15: TMSPM (3 phr) activated by 0.16 phr of radical initiator; addition of a covering agent (2 phr).

Composition No. 14 is the control for the test and contains 8% by weight TESPT relative to the weight of silica. Composition No. 15 is the composition according to the invention, and advantageously contains, relative to the weight of silica, less than 8% of coupling agent TMSPM (precisely, 6%) and, as coupling activator, a very small quantity of peroxide (0.16 phr, or 5.3% relative to the weight of TMSPM).

The covering agent is incorporated in the composition, at the same time as TMSPM and peroxide (non-productive stage) in order to improve further the processing in the uncured state (lowering of the viscosity) and the dispersion of the white filler in the elastomeric matrix.

Tables 7 and 8 show the formulation of the different compositions, and their properties before and after curing (150° C., 25 minutes). It will be noted that composition No. 15, compared with the control composition No. 14, has reinforcement properties after curing (M300 and ratio M300/M100) which are substantially greater, as well as improved hysteresis (HL, ΔG* and $\tan(\delta)_{max}$ which are lower): all this is due to better effectiveness of coupling of the alkoxysilane having an activated double bond, in the presence of the peroxide, relative to the conventional alkoxysilane TESPT.

E) Test 5

This test confirms the results of the preceding tests in the case of compositions comprising, as reinforcing white filler, a blend (50/50 by volume) of silica and alumina (alumina such as described in application EP-A-0 810 258 referred to above).

For this, three compositions based on natural rubber and intended for treads for truck tires are compared, which are identical except for the following differences:
 composition No. 16: coupling agent TESPT (4 phr);
 composition No. 17: coupling agent TMSPM (3.7 phr);
 composition No. 18: TMSPM (3,7 phr) with which there is associated 0.16 phr of peroxide.

Compositions No. 16 and No. 17 are the compositions according to the prior art, only composition No. 18 being in accordance with the invention. The two coupling agents tested are used in an isomolar amount of triethoxysilane functions (same number of moles of reactive functions with respect to the total white filler). Relative to the weight of white filler (65 phr), the amount of TESPT is equal to approximately 6% (precisely, 6.2%), and that of TMSPM is less than 6% (precisely, 5.7%). Tables 9 and 10 show the formulation of the different compositions, and their properties before and after curing (20 min at 150° C.).

Examination of the results of Table 10 confirms the advantages of the composition according to the invention, with in particular:
 satisfactory scorching resistance (T5 greater than 20 min), greater than that of the control composition No. 16;
 a Mooney plasticity which is sufficiently low in all cases (less than 50 MU);
 values of modulus M300 (relative to composition No. 17) and of ratio M300/M100 (relative to the two control compositions) which are greater;
 improved hysteresis properties, as illustrated in particular by a significantly lower value of $\tan(\delta)_{max}$, a very substantial reduction in the non-linearity ΔG* and in the losses HL.

F) Test 6

In this test, the action of the alkoxysilane coupling agent (TMSPM) is activated by a heat-triggered radical initiator other than a peroxide, namely the AIBN of Formula (III-2).

For this, two rubber compositions based on natural rubber and reinforced with silica are compared, which are identical except for the following differences:
 composition No. 19 (control): TMSPM (3.7 phr) used on its own;
 composition No. 20 (invention): TMSPM (3.7 phr) with which there is associated 0.5 phr of AIBN (or 13.5% relative to weight of coupling agent).

Figure 3:
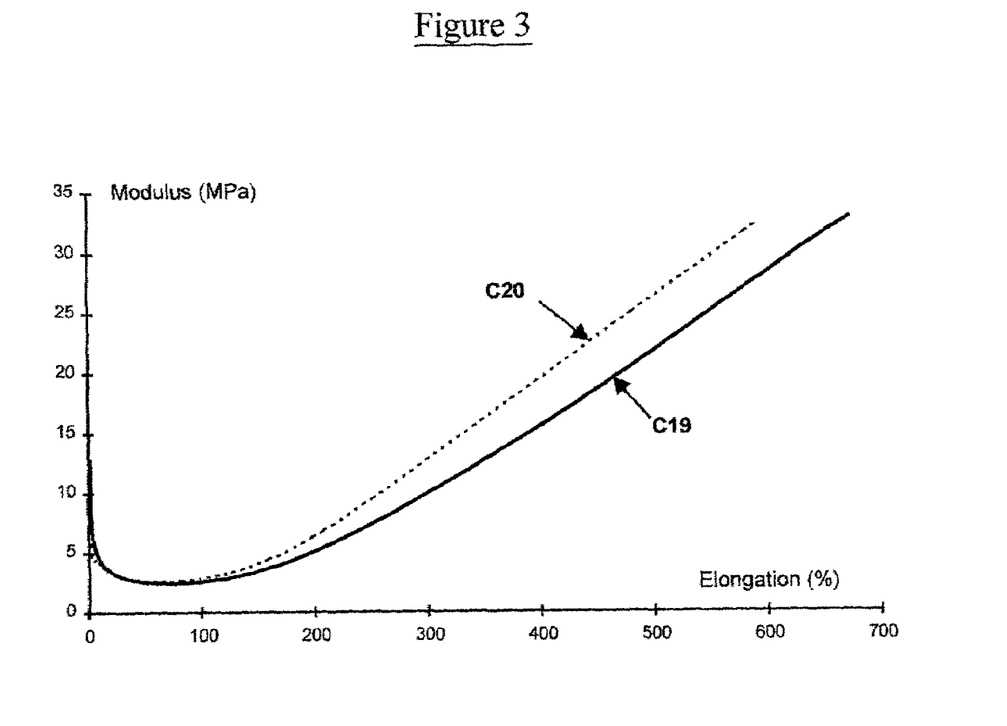

Tables 11 and 12 show the formulation of the compositions, and their properties before and after curing (25 min at 150° C.). FIG. 3 shows the curves of modulus (in MPa) as a function of the elongation (in %); these curves are marked C19 to C20, and correspond to compositions Nos. 19 and 20 respectively.

The superiority of the composition according to the invention is shown in particular for the properties after curing:
 an increase in the moduli at the high deformations (M100, M300) and in the ratio (M300/M100), which are clear indicators of improved reinforcement,
 correlated with more advantageous hysteresis properties: lower $\tan(\delta)_{max}$, non-linearity ΔG* much lower, losses HL clearly reduced.

FIG. 3 confirms the beneficial action of the AIBN on the coupling agent, with a curve of modulus (C20) which, for the largest deformations (elongations of 100% and more), is located clearly above the control curve (C19), the deviation becoming all the more pronounced as the elongation increases.

All these results illustrate, as already explained, a better quality of the bond between white filler and elastomer, probably due to the formation during mixing of additional bonds between the white filler and the diene elastomer, owing to the activation of the coupling provided by the AIBN.

In conclusion, as shown by the various tests above, the association of a coupling agent bearing an activated double ethylene bond with, in a very small quantity, a heat-triggered radical initiator, offers the compositions of the invention a compromise of properties which is particularly advantageous compared with the compositions of the prior art reinforced with a white filler such as silica.

Such an association makes it possible not only to increase very substantially the effectiveness of coupling of the coupling agents having an activated double ethylene bond, but also to exceed the coupling performance provided by the conventional polysulphurised alkoxysilanes such as TESPT.

The invention can be applied particularly advantageously in rubber compositions usable for the manufacture of treads for tires which have both low rolling resistance and high wear resistance, in particular when these treads are based on natural rubber or synthetic polyisoprene and are intended for tires for industrial vehicles of the truck type.

TABLE 1

| Composition No.: | 1 | 2 | 3 | 4 | 5 |
|---|---|---|---|---|---|
| NR (1) | 100 | 100 | 100 | 100 | 100 |
| silica (2) | 50 | 50 | 50 | 50 | 50 |
| silane (3) | 4 | 4 | — | — | — |
| silane (4) | — | — | 3.7 | 3.7 | 3.7 |
| peroxide (5) | — | 0.16 | — | 0.16 | — |
| ZnO | 3 | 3 | 3 | 3 | 3 |
| stearic acid | 2.5 | 2.5 | 2.5 | 2.5 | 2.5 |
| antioxidant (6) | 1.9 | 1.9 | 1.9 | 1.9 | 1.9 |
| sulphur | 1.5 | 1.5 | 1.5 | 1.5 | 1.5 |
| CBS (7) | 1.8 | 1.8 | 1.8 | 1.8 | 1.8 |
| peroxide (5) | — | — | — | — | 0.16 |

(1) natural rubber;
(2) silica of the type "HD" - Zeosil 1165MP from Rhodia in the form of microbeads (BET and CTAB: approximately 150–160 m$^2$/g);
(3) TESPT - Si69 from Degussa;
(4) TMSPM - Dynasylan Memo from Hüls;
(5) peroxide of Formula (III-1) - Trigonox 29/40 from Flexsys;
(6) N-1,3-dimethylbutyl-N-phenyl-para-phenylenediamine;
(7) N-cyclohexyl-2-benzothiazyl sulphenamide.

TABLE 2

| Composition No.: | 1 | 2 | 3 | 4 | 5 |
|---|---|---|---|---|---|
| Properties before curing: | | | | | |
| Mooney (MU) | 41 | 43 | 43 | 53 | 45 |
| T5 (min) | 23 | 22 | 30 | 30 | 30 |
| Properties after curing: | | | | | |
| M10 (MPa) | 2.7 | 2.7 | 3.7 | 3.1 | 3.7 |
| M100 (MPa) | 3.2 | 3.2 | 2.3 | 2.5 | 2.3 |
| M300 (MPa) | 7.0 | 6.9 | 5.1 | 7.1 | 5.1 |
| M300/M100 | 2.2 | 2.2 | 2.2 | 2.8 | 2.2 |
| HL | 14 | 13 | 19.5 | 14 | 19 |
| ΔG* (MPa) | 0.7 | 0.6 | 1.3 | 0.4 | 1.1 |
| tan (δ)$_{max}$ | 0.14 | 0.13 | 0.18 | 0.12 | 0.17 |
| Breaking stress (MPa) | 35 | 34 | 29 | 30 | 30 |
| Elongation at break (%) | 520 | 505 | 648 | 586 | 682 |

TABLE 3

| Composition No: | 6 | 7 | 8 | 9 |
|---|---|---|---|---|
| NR (1) | 100 | 100 | 100 | 100 |
| silica (2) | 50 | 50 | 50 | 50 |
| silane (8) | 4 | 4 | — | — |
| silane (9) | — | — | 4.8 | — |
| silane (10) | — | — | — | 4.8 |
| peroxide (5) | — | 0.16 | 0.16 | 0.16 |
| ZnO | 2.5 | 2.5 | 2.5 | 2.5 |
| stearic acid | 2 | 2 | 2 | 2 |
| antioxidant (6) | 1.9 | 1.9 | 1.9 | 1.9 |
| sulphur | 1.5 | 1.5 | 1.5 | 1.5 |
| CBS (7) | 1.8 | 1.8 | 1.8 | 1.8 |

(1) idem Table 1;
(2) idem Table 1;
(5) idem Table 1;
(6) idem Table 1;
(7) idem Table 1;
(8) 1-octenetriethoxysilane;
(9) N-(propyltriethoxysilane) isomaleimide - Formula II-3;
(10) N-(propyltriethoxysilane) maleamic acid - Formula II-2.

TABLE 4

| Composition No. | 6 | 7 | 8 | 9 |
|---|---|---|---|---|
| Properties before curing: | | | | |
| Mooney (MU) | 42 | 43 | 44.5 | 43 |
| T5 (min) | 30 | 30 | 30 | 30 |
| Properties after curing: | | | | |
| M10 (MPa) | 4.3 | 4.2 | 3.5 | 3.5 |
| M100 (MPa) | 2.1 | 1.9 | 2.7 | 2.5 |
| M300 (MPa) | 3.4 | 3.0 | 7.7 | 7.1 |
| M300/M100 | 1.6 | 1.6 | 2.8 | 2.8 |
| HL (%) | 23 | 24 | 15 | 16 |
| ΔG* (MPa) | 2 | 2 | 0.5 | 0.5 |
| tan (δ)$_{max}$ | 0.19 | 0.20 | 0.11 | 0.11 |
| Breaking stress (MPa) | 26 | 24 | 29 | 27 |
| Elongation at break (%) | 713 | 711 | 553 | 536 |

TABLE 5

| Composition No: | 10 | 11 | 12 | 13 |
|---|---|---|---|---|
| SBIR (11) | 100 | 100 | — | — |
| SBR (12) | — | — | 137.5 | 137.5 |
| silica (2) | 80 | 80 | 80 | 80 |
| silane (3) | 6.4 | — | 6.4 | — |
| silane (4) | — | 6.0 | — | 6.0 |
| peroxide (5) | — | 0.2 | — | 0.2 |
| aromatic oil | 37.5 | 37.5 | — | — |
| ZnO | 2.5 | 2.5 | 2.5 | 2.5 |
| DPG | 1.5 | 1.5 | 1.5 | 1.5 |
| stearic acid | 2 | 2 | 2 | 2 |
| antioxidant (6) | 1.9 | 1.9 | 1.9 | 1.9 |
| sulphur | 1.1 | 1.1 | 1.1 | 1.1 |
| CBS (7) | 2 | 2 | 2 | 2 |

(2) to (7) idem Table 1;
(11) SBIR with 20% butadiene units (45% of 1–2; 45% of trans); 44% isoprene units (37% of 3,4; 24% of trans); and 36% of styrene units; Tg = −23° C.;
(12) solution SBR with 73.5% butadiene units (59.5% of 1–2; 23% of trans); 26.5% of styrene units; Tg = −29° C.; 100 phr (dry) SBR extended with 37.5 phr of aromatic oil (namely; a total of 137.5 phr).

TABLE 6

| Composition No.: | 10 | 11 | 12 | 13 |
|---|---|---|---|---|
| Properties before curing. | | | | |
| Mooney (MU) | 36 | 31 | 53 | 47 |
| T5 (min) | 19 | 30 | 18 | 30 |
| Properties after curing: | | | | |
| M10 (MPa) | 5.4 | 3.7 | 5.5 | 4.4 |
| M100 (MPa) | 2.8 | 2.5 | 2.8 | 2.4 |
| M300 (MPa) | 6.9 | 8.1 | 6.8 | 7.1 |
| M300/M100 | 2.4 | 3.2 | 2.4 | 2.9 |
| HL | 30 | 24 | 31 | 28 |
| ΔG* (MPa) | 5.6 | 3 | 4.4 | 4.4 |
| tan (δ)$_{max}$ | 0.47 | 0.43 | 0.42 | 0.44 |
| Breaking stress (MPa) | 21 | 17 | 24 | 23 |
| Elongation at break (%) | 703 | 481 | 599 | 581 |

TABLE 7

| Composition No.: | 14 | 15 |
|---|---|---|
| NR (1) | 100 | 100 |
| silica (2) | 50 | 50 |
| silane (3) | 4 | — |
| silane (4) | — | 3 |
| peroxide (5) | — | 0.16 |

TABLE 7-continued

| Composition No.: | 14 | 15 |
|---|---|---|
| PDMS (13) | — | 2 |
| ZnO | 3 | 3 |
| stearic acid | 2.5 | 2.5 |
| antioxidant (6) | 1.9 | 1.9 |
| sulphur | 1.5 | 1.5 |
| CBS (7) | 1.8 | 1.8 |

(1) to (7) idem Table 1;
(13) α,ω-dihydroxy-polydimethylsiloxane (PS340 from ABCR).

TABLE 8

| Composition No.: | 14 | 15 |
|---|---|---|
| Properties before curing: | | |
| Mooney (MU) | 29 | 27 |
| T5 (mm) | 30 | 30 |
| Properties after curing: | | |
| M10 (MPa) | 4.2 | 3.8 |
| M100 (MPa) | 3.2 | 3.2 |
| M300 (MPa) | 7.0 | 9.4 |
| M300/M100 | 2.2 | 2.9 |
| HL | 13.5 | 10.5 |
| ΔG* (MPa) | 0.9 | 0.6 |
| tan (δ)$_{max}$ | 0.13 | 0.10 |
| Breaking stress (MPa) | 31 | 31 |
| Elongation at break (%) | 596 | 530 |

TABLE 9

| Composition No. | 16 | 17 | 18 |
|---|---|---|---|
| NR (1) | 100 | 100 | 100 |
| silica (2) | 25 | 25 | 25 |
| alumina (14) | 40 | 40 | 40 |
| silane (3) | 4 | — | — |
| silane (4) | — | 3.7 | 3.7 |
| peroxide (5) | — | — | 0.16 |
| ZnO | 3 | 3 | 3 |
| stearic acid | 2.5 | 2.5 | 2.5 |
| antioxidant (6) | 1.9 | 1.9 | 1.9 |
| sulphur | 1.5 | 1.5 | 1.5 |
| CBS (7) | 1.8 | 1.8 | 1.8 |

(1) to (7) idem Table 1;
(14) alumina CR125 from Baïkowski (in the form of powder - BET equal to approx 105 m²/g)

TABLE 10

| Composition No. | 16 | 17 | 18 |
|---|---|---|---|
| Properties before curing: | | | |
| Mooney (MU) | 38 | 37 | 43 |
| T5 (min) | 12 | 26 | 22 |
| Properties after curing: | | | |
| M10 (MPa) | 4.8 | 3.7 | 3.3 |
| M100 (MPa) | 3.0 | 2.2 | 2.2 |
| M300 (MPa) | 5.2 | 4.0 | 4.8 |
| M300/M100 | 1.7 | 1.8 | 2.1 |
| HL | 19.0 | 19.1 | 16.8 |
| ΔG* (MPa) | 1.8 | 1.7 | 1.0 |
| tan (δ)$_{max}$ | 0.18 | 0.18 | 0.14 |
| Breaking stress (MPa) | 29 | 27 | 28 |
| Elongation at break (%) | 644 | 680 | 660 |

TABLE 11

| Composition No. | 19 | 20 |
|---|---|---|
| NR (1) | 100 | 100 |
| silica (2) | 50 | 50 |
| silane (4) | 3.7 | 3.7 |
| AIBN (15) | — | 0.5 |
| ZnO | 3 | 3 |
| stearic acid | 2.5 | 2.5 |
| antioxidant (6) | 1.9 | 1.9 |
| sulphur | 1.5 | 1.5 |
| CBS (7) | 1.8 | 1.8 |

(1) to (7) idem Table 1;
(15) 1,1'-azobis(isobutyronitrile) of Formula (III-2); Vazo 64 from Du Pont de Nemours.

TABLE 12

| Composition No. | 19 | 20 |
|---|---|---|
| Properties before curing: | | |
| Mooney (MU) | 48 | 58 |
| T5 (min) | 30 | 30 |
| Properties after curing: | | |
| M10 (MPa) | 4.3 | 3.9 |
| M100 (MPa) | 2.3 | 2.5 |
| M300 (MPa) | 4.8 | 6.1 |
| M300/M100 | 2.1 | 2.5 |
| HL | 24.0 | 20.3 |
| ΔG* (MPa) | 2.2 | 1.5 |
| tan (δ)$_{max}$ | 0.22 | 0.19 |
| Breaking stress (MPa) | 28 | 28 |
| Elongation at break (%) | 673 | 595 |

The invention claimed is:

1. A tire comprising a rubber composition based on at least:

(A)—one diene elastomer selected from the group consisting of natural rubber, synthetic polyisoprenes and mixtures of these elastomers (component A);

(B)—a reinforcing white filler (component B);

(C)—a coupling agent (white filler/diene elastomer) bearing at least one activated carbon—carbon double bond (component C), with which there is associated:

(D)—between 0.05 and 0.5 phr (parts by weight per hundred of elastomer) of a heat-triggered radical initiator (component D), wherein component C is N-(propyltriethoxysilane) maleamic acid, of the formula:

or N-(propyltriethoxysilane) isomaleimide, of the formula:

2. The tire according to claim 1, wherein component C is N-(propyltriethoxysilane) maleamic acid, of the formula:

3. The tire according to claim 1, wherein component C is N-(propyltriethoxysilane) isomaleimide, of the formula:

4. The tire according to claim 1, wherein component D is selected from the group consisting of peroxides, hydroperoxides, azido compounds, bis(azo) compounds, peracids, peresters and mixtures of these compounds.

5. The tire according to claim 1, wherein component A is formed exclusively of a material selected from the group consisting of natural rubber and synthetic polyisoprene.

6. A tire tread comprising a rubber composition based on at least:
   (A)—one diene elastomer selected from the group consisting of natural rubber, synthetic polyisoprenes and mixtures of these elastomers (component A);
   (B)—a reinforcing white filler (component B);
   (C)—a coupling agent (white filler/diene elastomer) bearing at least one carbon—carbon double bond (component C), with which there is associated:
   (D)—between 0.05 and 0.5 phr (parts by weight per hundred of elastomer) of a heat-triggered radical initiator (component D),
wherein component C is N-(propyltriethoxysilane) maleamic acid, of the formula:

or N-(propyltriethoxysilane) isomaleimide, of the formula:

7. The tread according to claim 6, wherein component C is N-(propyltriethoxysilane) maleamic acid, of the formula:

8. The tread according to claim 6, wherein component C is N-(propyltriethoxysilane) isomaleimide, of the formula:

9. The tread according to claim 6, wherein component D is selected from the group consisting of peroxides, hydroperoxides, azido compounds, bis(azo)compounds, peracids, peresters and mixtures of these compounds.

10. The tread according to claim 6, wherein component A is formed exclusively of a material selected from the group consisting of natural rubber and synthetic polyisoprene.

* * * * *